Dec. 3, 1935.   D. TAYLOR   2,023,036
LINT COLLECTING APPARATUS
Filed Sept. 7, 1934   2 Sheets-Sheet 1
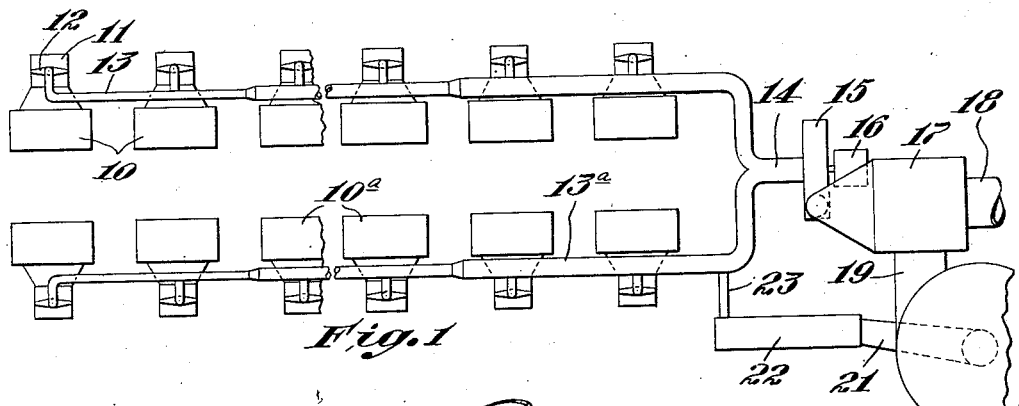
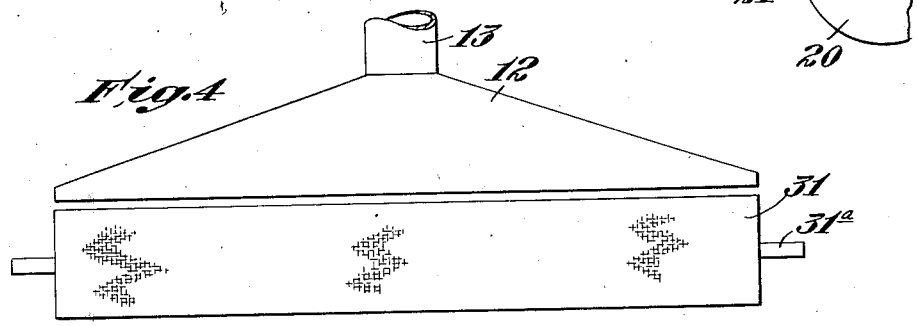
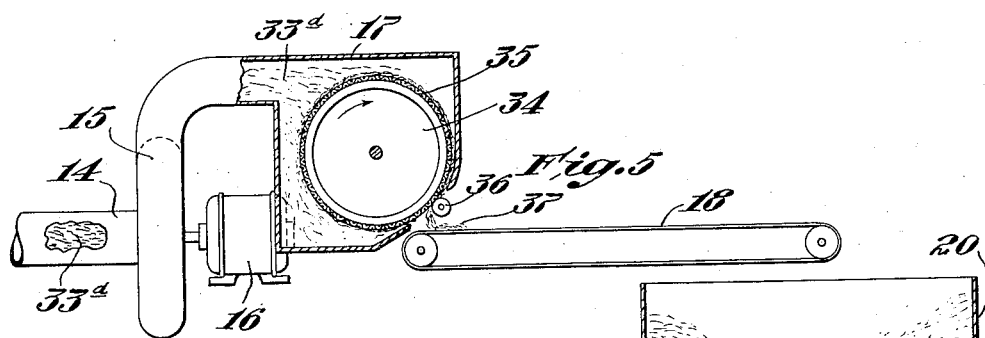
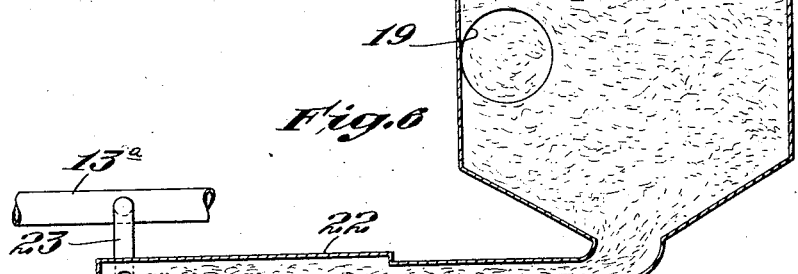
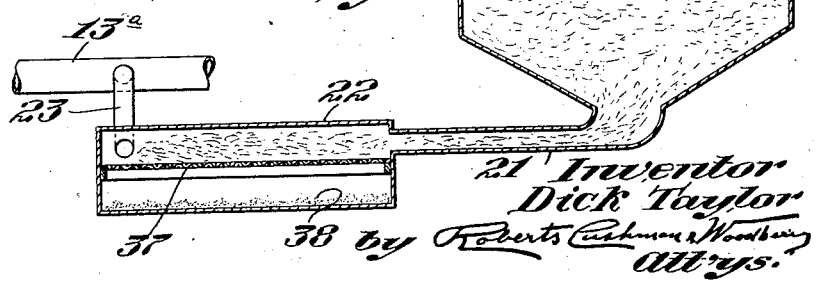
Inventor
Dick Taylor
by Roberts Cushman Woodbury
Attys.

Dec. 3, 1935. D. TAYLOR 2,023,036
LINT COLLECTING APPARATUS
Filed Sept. 7, 1934 2 Sheets-Sheet 2
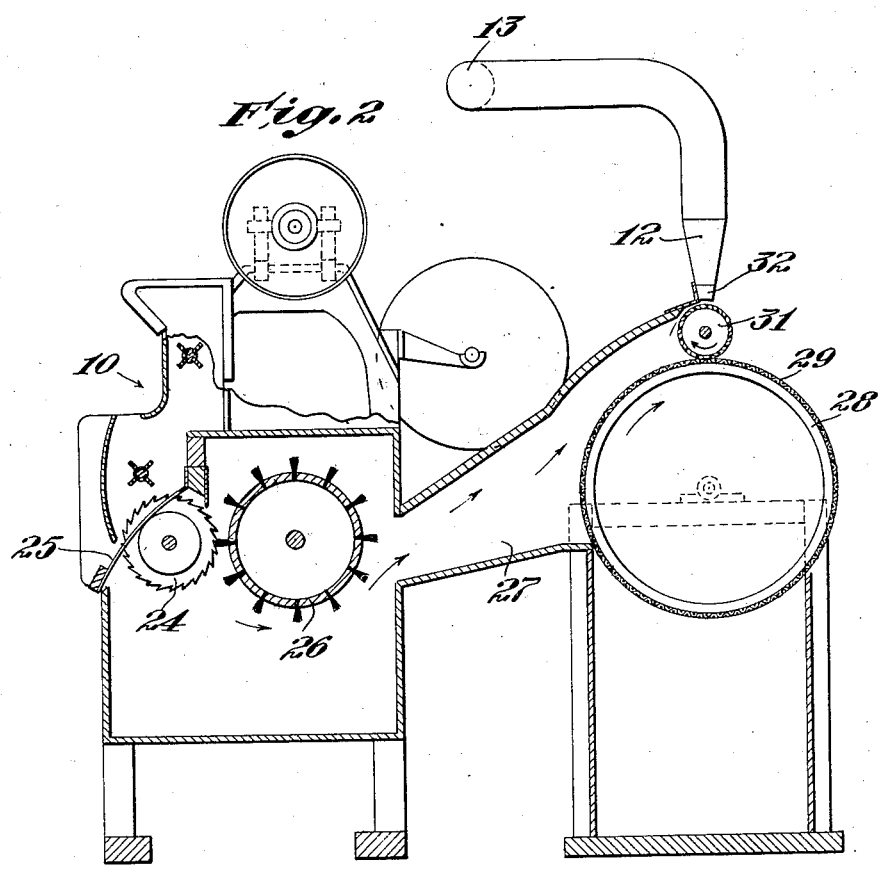
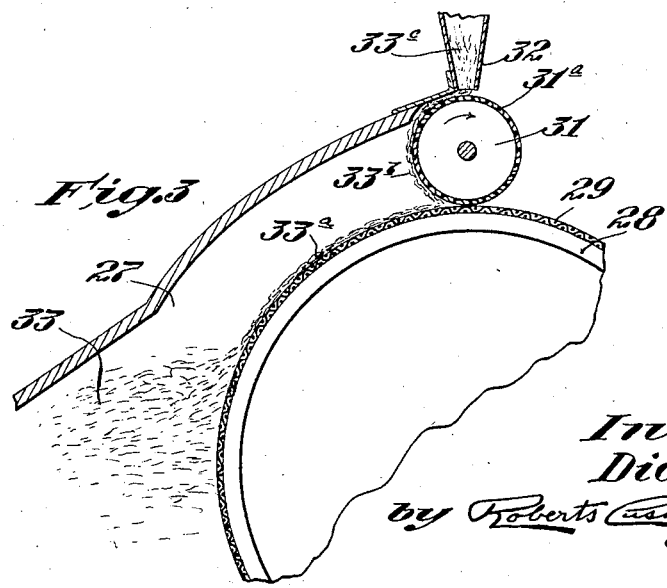
Inventor
Dick Taylor
by Roberts Cushman & Woodberry
Att'ys.

Patented Dec. 3, 1935

2,023,036

UNITED STATES PATENT OFFICE 2,023,036

LINT COLLECTING APPARATUS

Dick Taylor, Paris, Tex., assignor to Southland Cotton Oil Company, Paris, Tex., a corporation of Texas Application September 7, 1934, Serial No. 743,029

6 Claims. (Cl. 19—156)

This invention pertains to lint-collecting apparatus and in the embodiment herein chosen for illustration relates more specifically to apparatus useful in combination with a linter gin or gins, although the broad principle of the invention is applicable to other types of lint or fiber producing or treating apparatus.

A linter gin, such as is employed for removing short fiber from cotton seeds preparatory to the extraction of the oil from the latter, commonly comprises as its most essential elements a rotary saw cylinder, a grate or grid, a rotary doffing brush, and a rotary condenser screen or cylinder. The saw cylinder and doffer brush are driven at high speed and the rotating brush acts as a fan, creating a powerful current of air in which the lint, (removed from the saw by the brush bristles) is suspended. This current of air passes through the condenser and the lint collects on the periphery of the latter while the air, substantially freed from fiber, passes through the meshes of the screen cylinder of the condenser and escapes. The collected fiber is removed from the surface of the screen cylinder, usually in the form of a lap which is wound on a roller.

This arrangement, in which each linter gin is furnished with its own individual condenser cylinder, has certain characteristics which, from a practical standpoint, are quite desirable. In the operation of a linter gin, it is requisite to make accurate relative adjustments of the various parts of the gin in order that the clean fiber may be separated efficiently from the motes, trash, etc., and proper relative adjustment of the various gin parts is to a certain extent dependent on the volume of air which passes through the gin. On the other hand, while this arrangement has some advantages, it also has certain objectionable features. For example, such individual condensers are ordinarily designed to deliver the air from the condenser directly into the work room, but as this air carries a great deal of fine dust and very short fiber, it produces atmospheric conditions in the room which are detrimental to the health of the workers and also creates an undesirable fire hazard. Moreover in dealing with very short fiber, for example, second-cut lint, difficulty is often experienced in handling the lap roll from the individual gin, since the fiber is so short and lacking in cohesion that the roll breaks very easily.

In order to avoid the first, at least, of these objectionable features, it has been proposed to dispense with the individual condenser for each gin, and to connect a battery of gins, by means of flues, to a single large condenser from which the lint may be doffed in any desired manner. However, such an arrangement requires that all of the air delivered by the several gins be carried to this single large condenser, and this necessitates the employment of large flues to accommodate the air delivered by the brushes of the several gins, and the provision of a blower or fan capable of maintaining such an air velocity throughout all of these large flues as to prevent the lint from settling and clogging the passages while on its way to the condenser. These large flues occupy a great deal of room,— they are costly to install,—and a blower of the proper capacity consumes a great deal of power. Thus the first cost of such an installation is high and the operating expenses are very great. Moreover, such a system does not permit the accurate operation of individual gins such as may be done when each has its own condenser, since the volume of air through a gin, when connected into such a common condenser system, no longer depends upon the speed of the individual gin brush.

In acordance with the present invention I retain certain of the desirable features of both of the prior systems, while avoiding their defects, and further secure improved results not heretofore obtainable by any apparatus known to me. To this end I provide each individual gin with its own rotary condenser screen, thus permitting regulation of each gin independently of the others, but instead of doffing each cylinder to form an independent lap roll, I remove the condensed fiber from each condenser cylinder and convey such fiber, preferably by pneumatic means, in suspension in a current of air, to a main condenser where the lint from all of the gins is deposited and doffed in any appropriate way, for example, to form a lap roll or if the fiber be very short, it may be doffed and delivered into a bin or onto a conveyor for disposal at any desired point. Preferably the air discharged from the main condenser is led through a dust separator where the suspended particles are freed from the air, and these particles which may comprise some very short lint comingled with dust, may be separated mechanically or otherwise so as to seggregate the short fiber, and the latter may then be delivered to the intake of the main condenser for deposit with the longer lint.

This improved system is advantageous in that the flues for conveying the lint need not be nearly so large as in the usual conveyor system, since the volume of air necessary to carry the lint, and the power for maintaining the lint conveying air current through these small flues, is very small as compared with that necessary in prior systems; in accordance with this new arrangement all of the lint is passed through two condensers in succession, thus providing a better and more effective separation; the clean lint is all automatically delivered at one point; the individual control of the several gins is not interfered with; there is less danger of sucking separated dust or motes back into the lint than is the case when each gin is provided with an individual condenser which delivers to a lap roll, and the smaller flues employed occupy less space than is necessary for the installation of prior systems.

Fig. 1 is a diagrammatic plan view, with parts broken away, illustrating one desirable embodiment of my improved lint collecting apparatus as applied to a battery of linter gins;

Fig. 2 is a diagrammatic elevation, partly in vertical section, illustrating a linter gin of conventional type provided with novel doffing means in accordance with my invention;

Fig. 3 is a fragmentary vertical section, to larger scale, showing details of my improved gin doffing means;

Fig. 4 is an elevation, looking from the right-hand side of Fig. 2, showing the doffing roll and nozzle forming a part of my novel apparatus;

Fig. 5 is a diagrammatic elevation, partly in vertical section, showing the main condenser to which the lint from all of the gins of the battery is delivered; and Fig. 6 is a diagrammatic vertical section illustrating lint separating means, preferably associated with the main condenser illustrated in Fig. 5.

Referring to the drawings, and particularly to Fig. 1, I have illustrated a series of linter gins 10, each having condenser means 11 and individual doffing means 12, the latter delivering the collected lint to a conveyor pipe, trunk, or duct 13 extending lengthwise of the series of gins 10, and which receives the lint doffed from each gin. Fig. 1, I have shown a second series 10ª of linter gins similar to the first series and each of which delivers to a lint conveying pipe, trunk, or duct 13ª. Obviously the battery of gins included in my system may have as many series 10, 10ª, etc. of gins as may be desired, and each series may comprise a greater or lesser number of gins in accordance with circumstances, and in particular as determined by the available space. As here shown, the pipes 13 and 13ª deliver to a common or main pipe 14 leading to a fan blower 15 driven by a motor 16.

The air delivered from the fan 15 passes into a condenser 17 which separates the major portion of the suspended lint from the air, and which delivers the lint either in the form of a lap roll or as loose material. In the latter case, the lint if desired, may be dropped onto a conveyor 18 or directly into a bin or other receptacle. The air which escapes from the condenser 17 passes through a delivery pipe 19 and preferably into a cyclone dust collector 20. The air escapes freely from the top of this collector, while the solid material, comprising dust and some short fiber, drops down into the delivery pipe 21 from which it passes into the dust separator 22 where fine particles of dust, for example hull-pepper, are separated from the short fiber and the latter is delivered through the pipe 23 back into the pipe 13ª for redelivery to the condenser 17.
While the dust and lint separating mechanism comprising the parts 20, 22, etc. is desirable, it may be dispensed with, in which event the pipe 19 should preferably lead to some point of discharge in the open air.

Referring to Figs. 2 to 6 inclusive, the gin 10 is shown as of conventional form, comprising the saw cylinder 24, the grate-fall 25, the doffer brush 26, and the lint flue 27 leading to the condenser cylinder 28. This condenser cylinder is provided with a screen periphery 29 through which the air delivered by the brush 26 passes freely into the interior of the cylinder, the latter being open at its ends, if desired, for the free discharge of this air. However, if preferred, the ends of the cylinder may communicate with ducts or pipes leading to the exterior of the gin house.

The doffing means which removes the collected fiber from the periphery of the cylinder 28 preferably includes a rotating roll 31 having its peripheral surface covered with burlap, canvas, or equivalent material adapted to remove the lint from the periphery of the condenser cylinder 28 and to pick up and carry this lint around on its peripheral surface. As illustrated in Fig. 3, the lint 33 which passes through the duct 27 in suspension in the air current from the brush, collects to form a very thin film or layer 33ª on the screen 29, and this film is picked off on the fabric covering 31ª of the roll 31 to form a thin film 33ᵇ. Just above the upper part of the roll 31 I arrange a pneumatic suction nozzle 32 which, by way of pipes 13 and 14, communicates with the blower 15 so that air enters the end of the nozzle 32 with sufficient force and velocity to pick up the film 33ᵇ of lint adhering to the cylinder 31 and carry it, in the form of loose suspended fiber 33ᶜ, upwardly into the nozzle and thence through the duct or pipe 13 and through the main 14 and the blower 15 into the condenser 17. As each individual gin 10 and 10ª is equipped with similar doffing mechanism, all of the lint from the battery of gins enters the main condenser 17 in suspension in the air current as shown at 33ᵈ (Fig. 5). This condenser may for example comprise a casing preferably housing a rotary condenser cylinder 34 having a screen periphery 35 on which the lint collects to form a thin film, while the air passes through the screen and is delivered from one or both ends of the cylinder into the pipe 19. The film of lint which collects on the screen 35 is removed by a suitable doffer device 36, and may be rolled up to form a lap, or preferably, if the fiber is very short, may be dropped loosely as shown at 37 onto a conveyor belt 18 which delivers it at any desired point.

The air from the interior of the cylinder 34 passes through the pipe 19 and enters the cyclone separator 20 tangentially, and as above described, the dust and fine lint which settles out are carried through the pipe 21 by means of the slight current of air induced in the latter by the flow through the pipe 13ª, and in passing through the casing 22 the very fine dust or hull-pepper falls through the screen 37 and collects in the compartment 38 while the short useful fiber is returned through the pipe 23 to the main current of air in the pipe 13ª, and in its next passage through the condenser 17 may be deposited with the longer fiber on the screen 35. Obviously, any desired form of dust separating apparatus may be substituted for the parts 20 and 22, or one or both may be omitted.

It will be noted that in the system above described, each individual linter gin is independently driven and that the air which flows through the gin and through its individual condenser cylinder 28 is that produced in the gin itself, so that the gin parts may be accurately adjusted relatively to each other without reference to the presence of other gins in the battery. On the other hand, all of the fiber condensed on each condenser cylinder is automatically removed from the vicinity of the gin and pneumatically conveyed to the common or main condenser 17 by means of an air current wholly independent of that produced in the gin and which may be of relatively small volume. Moreover all of the lint must pass through two condensers in succession before final delivery, so that proper cleaning of the lint is assured. With this arrangement, due to the possibility of individual regulation of the several gins, a better quality of lint is produced and only about one-fifth as great an amount of power is required in conveying the lint to the main condenser as has been required in prior systems wherein a plurality of gins are arranged to deliver their lint through a flue system to a common condenser. Furthermore, the cost of installation of this improved system is far less than that of prior flue systems delivering to a common condenser and the space required for the installation is not nearly so great.

While I have herein illustrated one desirable embodiment of the invention by way of example, I wish it to be understood that the invention is not necessarily limited to this particular arrangement, but that any equivalent construction, operating in substantially the same way, which is included within the scope of the appended claims is to be regarded as forming a part of my invention.

I claim:

1. In combination with a plurality of gins each having a rotary brush and a rotary condenser cylinder, a main condenser common to the several gins, said main condenser having a rotary cylinder, a doffer roll cooperating with the first condenser cylinder frictionally to remove collected lint from the latter, a pneumatic suction nozzle arranged to remove the lint from the doffer roll, a conveyor duct leading from the suction nozzle of each gin to the main condenser, means for creating an air flow through such conveyor ducts whereby to carry lint from the several nozzles to the main condenser, and means for doffing the main condenser.

2. In combination with a gin having a rotary condenser cylinder, a second condenser, a doffer arranged to remove collected lint from the first condenser, a conduit for conveying lint laden air from the doffer to the second condenser, means operative to create a lint carrying air current in said conduit whereby to carry the doffed lint to the second condenser, means for doffing the second condenser, means for separating entrained particles of dust and fine lint from the air discharged from the second condenser, and means for returning such separated particles of fine lint to the conduit.

3. In combination with a plurality of gins each having a rotary cylindrical condenser and doffing means including a friction pick up roll cooperable therewith, a main condenser, a suction nozzle arranged to remove lint by suction from the surface of each pick up roll, conduits leading from the suction nozzle of each individual gin to said main condenser, means operative to create lint conveying air currents in said conduits, and means for doffing the main condenser.

4. In combination with a plurality of gins each having a rotary brush, a cylindrical screen condenser, and a doffer roll operative to remove accumulated lint from each condenser, a suction nozzle operative to remove lint from each doffer roll, a main condenser, conduits leading from the suction nozzle of the several gins to the main condenser, a fan operative to maintain a lint conveying air current in each of said conduits thereby to carry the doffed lint from each gin to the main condenser, and means for doffing lint from the main condenser.

5. In combination with a plurality of gins each having a rotary brush, a rotary cylindrical screen condenser from which air freed from lint is discharged, and a cloth covered doffer roll operative by friction to remove accumulated lint from the condenser of each gin, a pneumatic suction nozzle associated with each doffer roll, conveyor means leading from each of said nozzles to a main condenser, means operative to create a lint conveying air current in said conveyor means, and means for doffing the main condenser.

6. In combination with a plurality of gins each having a rotary cylindrical screen condenser and an associated doffer roll arranged to remove and to receive the lint which collects on the condenser cylinder, a suction nozzle associated with each of said doffer rolls, each nozzle operative pneumatically to remove lint from its associated roll, a main condenser having a screen for the collection of lint, pneumatic conveyor means leading from each of said nozzles to the main condenser, means for maintaining a lint conveying current of air in said conveyor means, said air passing through the main condenser, means operative to separate dust and short fiber from the air discharged from the main condenser, means for separating the short fiber from the dust, and means for returning the short fiber to the pneumatic conveying means.

DICK TAYLOR.